United States Patent Office 2,943,515
Patented July 5, 1960

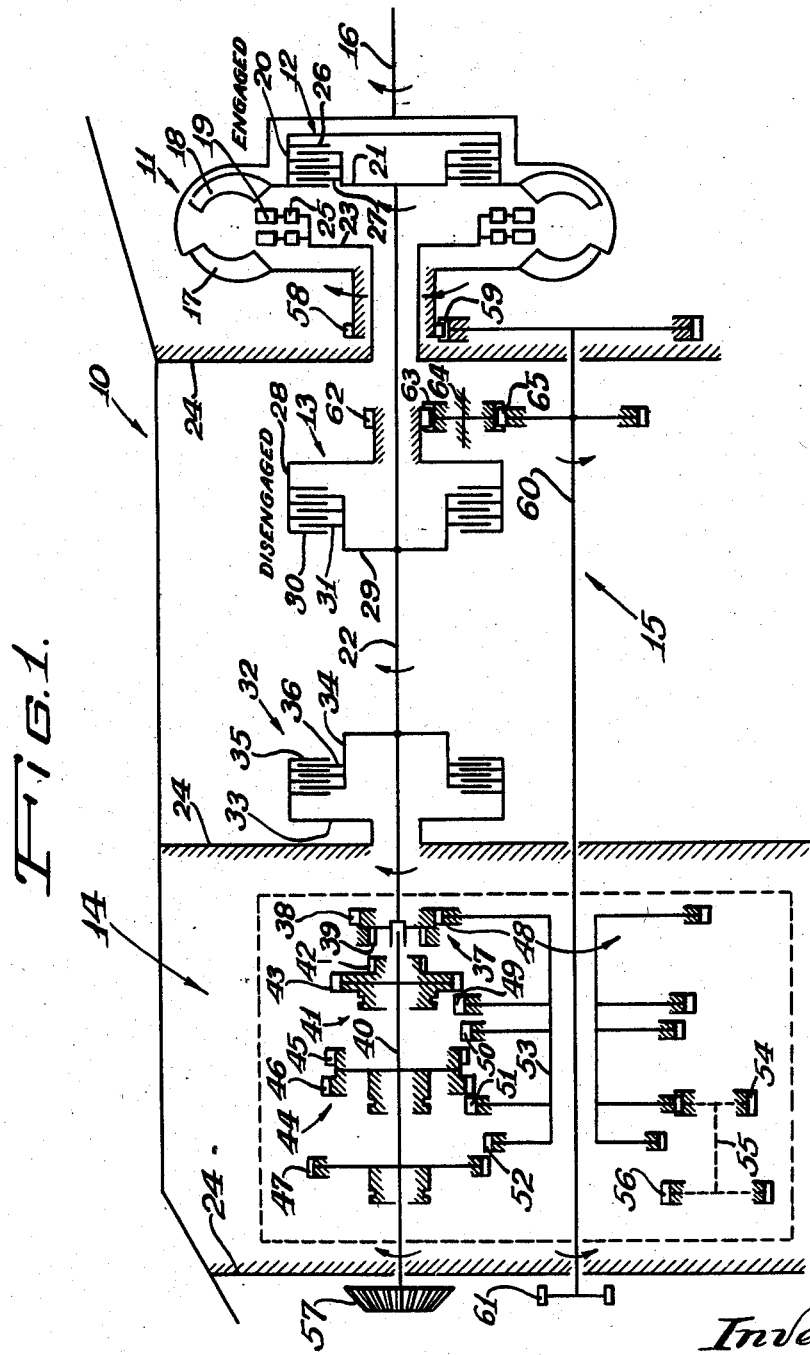

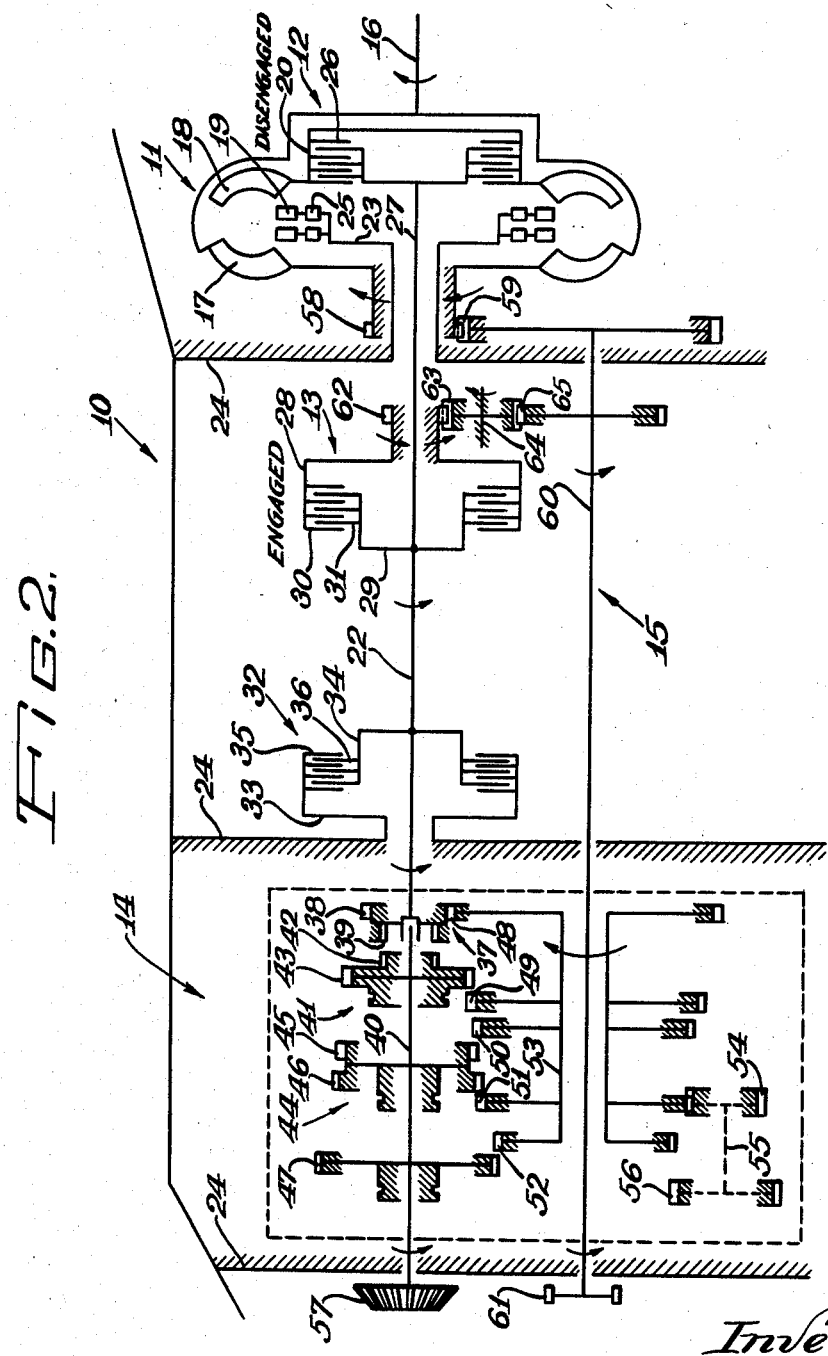

2,943,515
POWER TRANSMITTING APPARATUS

Jerrold Anselm Isaacson, Lombard, Ill., and Henry Anthony Ferguson, Waterloo, Iowa, assignors to International Harvester Company, Chicago, Ill., a corporation of New Jersey Filed Feb. 12, 1959, Ser. No. 792,732

7 Claims. (Cl. 74—730)

This invention relates to power transmitting apparatus, but more specifically it is directed to an arrangement employing a hydro-kinetic type of torque transmitting unit in combination with a change-speed gear box transmission unit and a plurality of selectively operable clutch means, and which is suitable for use in a tractor vehicle.

As is well known the hydro-kinetic type of torque converter unit has been employed with various forms of drive mechanisms in order to provide a vehicle power transmitting unit which could be operated either manually or automatically. Likewise, many variations thereof were developed for specific power or drive transmitting applications and, usually, each such combination was limited to the use for which it was developed. Because of the limitations naturally imposed by such restrictive application and demand, units of this character did not always incorporate therein the particular characteristics which would have enhanced their use and demand in a greater variety of applications. One factor of paramount importance, frequently missing or inadequately utilized in such transmission units when employed with tractor vehicles commonly used for earth moving operations, is that of flexibility. In such installations it is quite essential that the vehicle be highly maneuverable and that change in direction of motion of the vehicle from forward to reverse, and vice-versa, be accomplished in a very minimum of time, and with a minimum of effort in order to minimize operator fatigue. It is also highly desirable that the change in direction of motion be accomplished in at least the same speed gear ratio so that the operator can back the vehicle away with a load more rapidly than would ordinarily be possible with a conventional transmission. In fact, most operators of such vehicles prefer to move the vehicle in a reverse direction, or away from the point where the loading is done, faster than they approach the location of the work in a forward direction. Such maneuverability, of course, is not readily attained with a vehicle wherein it is necessary to shift gears to effect this direction and speed movement change. Consequently, many of the drives heretofore provided, employing a torque converter in combination with other drive units, were not very efficient in accomplishing the high degree of maneuverability desired. Transmission units of this character, additionally, were usually costly to manufacture and difficult and costly to service.

The present invention has as its primary objective the provision of a power transmitting unit that utilizes a torque converter, a change-speed transmission gear box and a plurality of clutch means in a combination that overcomes the heretofore mentioned disadvantages of comparable prior art devices, and, in addition, envisages the provision of a unit that is economically practicable and readily adaptable for use with conventional vehicle structures.

Another object is to provide a variable speed drive and torque transmitting mechanism which is extremely flexible in use and, by virtue of such flexibility, permits a vehicle equipped therewith to be highly maneuverable.

A further object is to provide a drive transmitting mechanism wherein the shift or change from a forward to a reverse direction of travel, or vice-versa, may be easily and very rapidly accomplished by engagement of clutch means without having to effect such change in direction of motion by a shifting of gears or the like in a change-speed gear box transmission unit, and wherein the speed of the vehicle in any selected gear ratio of the change-speed transmission unit thereof with the reverse clutch means engaged will always be greater than when the forward clutch means is engaged.

A still further object is to provide drive transmitting apparatus having a snubber brake means incorporated therein operable to prevent creep of a vehicle so equipped, when a plurality of clutch means utilized in association with said drive are disengaged.

A yet still further objective of the invention involves the provision of a variable speed and torque transmitting apparatus having an independent power take-off drive shaft included therein which is operative, at one time, to provide independent drive from a vehicle's power plant for use by auxiliary equipment and, at another time, to function in a dual capacity by, additionally, providing a portion of a power train for transmitting drive in a reverse direction of rotation from a vehicle power plan to the final drive thereof.

Another important object is to provide in a vehicle having power transmitting apparatus with a hydro-kinetic type of torque converter therein, power train means for transmitting drive from the power plant of the vehicle mechanically around the fluid coupling elements of the torque converter to the final drive thereof for operating the vehicle in a reverse direction of rotation.

Before explaining the present invention in more detail it should be understood that it is not limited in its application to the specific details of construction and arrangement or disposition of parts illustrated in the accompanying drawings, since the invention is capable of other embodiments and of being practiced or carried out in various ways. It should also be understood that the phraseology or terminology employed herein is for the purpose of description and not of limitation.

The present invention includes the novel construction, arrangements and devices that will subsequently be described and claimed for accomplishing the above noted objects together with such other objects as will be apparent from the following description of a preferred embodiment of the invention, as illustrated, with reference to the accompanying drawings in which:

Figure 1 is a diagrammatic vertical longitudinal section through one form of a power transmission mechanism constructed according to the present invention, the forward motion clutch means being engaged and with power flow following the path as indicated by the arrows; and Figure 2 is a diagrammatic view similar to Figure 1, but with the reverse motion clutch means engaged and the power flow path as indicated by the arrows.

In the drawings, wherein there is illustrated one preferred form of the invention, the power or drive transmitting apparatus, indicated generally by the reference numeral 10, will be seen generally to include a hydro-kinetic type of torque transmitting unit 11, a pair of friction clutches 12 and 13, a change-speed gear box transmission assembly 14 and a power take-off drive mechanism 15.

An input shaft 16 is adapted to receive power from a vehicle engine or power plant (not shown) and transmit it to the torque converter 11 which, as is understood, includes an impeller or driving element 17, a rotor or driven element 18, and a pair of stator or reaction elements 19. The impeller is connected to the input shaft 16, and the rotor 18 is suitably secured to and for rotation with the driving element 20 of clutch 12, while the driven element 21 of said clutch is splined or otherwise suitably mounted for rotation with an intermediate power transmitting shaft 22. The stator elements 19 are rotatably disposed on a central hub member 23 fixed with respect to the casing of the transmission, a portion only of which is shown and indicated generally by the reference numeral 24. A one-way roller brake 25 is provided between the hub 23 and each of the elements of the stator 19 for allowing the stator to rotate only in the forward direction, for purposes well known in the transmission art. The intermediate shaft 22 may be rotatably disposed with respect to the casing 24 by suitable bearing means (not shown). The impeller 17 is rotatably disposed on an axially extending portion of the hub 23 by suitable bearing means (not shown), as is well understood.

The forward motion clutch 12, being of conventional design and construction, has a driving bell or cup element 20 thereof in which there are slidably splined a plurality of friction plates such as 26, and an inner hub or driven shell 21 that has slidably splined thereon a plurality of friction plates 27, which are interleaved with the plates 26, while said driven inner hub is fixed for rotation with the intermediate power shaft 22. Suitable means (not shown) will be provided, as is well understood, for slidably moving the friction plates 26 and 27 to effect engagement and disengagement of said clutch. However, since operating mechanisms to accomplish this action are so well known, and frequently are dependent upon the particular clutch device employed, it is felt it would serve no useful purpose, as the concepts of the invention do not depend upon any particular clutch actuating means, to elaborate on the details of such mechanisms herein.

The reverse motion clutch 13, even though illustrated as being positioned in a back-to-face relation with clutch 12 may be otherwise disposed, and, being of conventional design and construction, may also be generally similar in structure to that of clutch 12. Said clutch 13, generally, comprises an outer driving bell or cup member 28, an inner shell or driven hub 29, and interleaved clutch plates 30 and 31 slidably splined, respectively, to said outer driving bell and inner driven hub members. The inner driven hub 29 is splined or otherwise fixed for rotation with the intermediate power shaft 22, while the outer driving hub 28 is rotatably mounted on said intermediate shaft. As mentioned, in connection with the description of clutch 12, clutch 13 will also be provided with suitable means (not shown) for actuating the latter clutch so as to effect engagement and disengagement thereof, when desired, and as is well understood in the art.

Although any one of many well known types of clutches may be used for the above purposes it will be appreciated that when such clutches are of the oil-filled or immersed type the oil drag therein will be greater than when other types are employed, as is well understood in the art; hence the tendency for a vehicle to creep, when the clutches are disengaged, will be greater with clutches of the oil-filled variety. The tendency to creep, although maximized with certain type clutches and minimized with others, appears to always be present in some degree, and consequently it has been found desirable to eliminate or stop the creeping produced by such action by means of a snubber brake mechanism, such as is indicated generally by the reference numeral 32. This braking action may be accomplished with any one of a number of different braking means without deviating from the broad teachings of the invention, but for puroses of illustration the brake 32 will be seen to generally resemble in its schematic representation the clutches 12 and 13. Accordingly, it may comprise an outer bell or cup member 33 mounted on and fixed against movement with respect to a portion of the transmission casing 24, an inner hub or shell 34 splined onto or otherwise fixed for rotation with the intermediate shaft 22, and interleaved friction clutch plates 35 and 36 slidably splined, respectively, to the outer bell 33 and inner hub 34. The brake 32 will, of course, be provided with suitable means (not shown) to move the interleaved plates axially with respect to one another and thus effect engagement or disengagement thereof so as to control rotation of power shaft 22, and incident thereto, creeping of the vehicle.

The change-speed gear box or transmission unit assembly 14, being of generally conventional construction, will be seen to comprise a gear cluster 37 that includes an external gear 38 and an internal gear 39 both of which are fixed for rotation with the intermediate shaft 22, a power output shaft 40 piloted in one end of shaft 22, a gear cluster 41 including gears 42 and 43 slidably splined onto the output shaft 40, a gear cluster 44 supporting gears 45 and 46 slidably splined onto the shaft 40, and a gear 47 also splined onto the shaft 40. This gear box unit also includes gears 48, 49, 50, 51 and 52 fixed for rotation with a tubular countershaft 53 and said latter gears are adapted to mesh, respectively, with the gears 38, 43, 45, 46 and 47, and, additionally, includes a reversing gear 54 in constant mesh with gear 51 and fixed for rotation on a shaft 55 with a gear 56 on the opposite end thereof adapted when selected to meshingly engage the gear 47. The power output shaft 40 has a beveled gear 57 on the outer end thereof that is adapted for coupling with the gearing of the final drive mechanism (not shown) usually provided in a vehicle of the character having the present invention incorporated therein.

The power take-off drive 15 originates with a gear 58 which is fixed for rotation with the impeller or driving element 17 of the torque converter 11 while said driving element, in turn, is connected for rotation with the power input shaft 16. The gear 58 is disposed in constant meshing relation with a gear 59 suitably mounted on one end of a power take-off shaft 60 and fixed for rotation therewith. The power take-off shaft 60, which is radially displaced from the power shaft 22, extends through the change-speed transmission 14 to a power take-off element, such as the belt pulley indicated at 61 which is affixed to the opposite end thereof. Said latter shaft is positioned to extend axially through the tubular countershaft 53 and may be suitably journalled therewithin as well as in the casing 24 by any well known bearing means (not shown), all as is well understood.

The outer bell or driving hub member 28, of clutch 13, has affixed for rotation therewith a gear 62 which is in constant mesh with a gear 63 on a shaft 64 that, in turn, is suitably journalled by means (not shown) in a portion of the casing 24. Gear 63 is in constant mesh with a gear 65 fixed for rotation with the power take-off shaft 60, thus providing a power or drive train that places the outer bell 28, of clutch 13, in constant and positive driving connection with said power take-off shaft. The gear 63, being disposed in meshing relation between the gears 62 and 65, functions as a reversing idler and aids in causing the outer bell or hub 28, of clutch 13, to rotate always in a direction opposite to that of the inner hub 21, of clutch 12. The gears in the power train from the power take-off shaft 60 through clutch 13 to the intermediate shaft 22 are selected, preferably, so that the speed at which the shaft 22 is rotated, when the reversing motion clutch 13 is engaged, is somewhat greater (approximately 62% in one preferred design) than when the power train or drive from the torque converter to shaft 22 includes the forward motion clutch 12 and said latter clutch is engaged.

*Operation*

The operation of the proposed drive transmitting apparatus may be readily understood by following the flow path of the torque or drive through the components of the structure under the various and most frequently encountered operating conditions.

The power input drive shaft 16, which as understood, is driven by a vehicle engine or power plant, and normally rotated in a clockwise direction by that engine, and, as shown by the arrows in Figure 1, drivingly rotates the driving element 17 of the torque converter in a similar clockwise direction. At the same time the turbine rotor or driven element 18 of the converter, by virtue of the reaction of the coupling fluid and the stator elements 19, is rotated clockwise and the attached driving bell or hub 20 of clutch 12 is rotated in the same clockwise direction.

Assuming, now, that selection of the desired speed gear ratio through the change-speed transmission 14 has not yet been made and movement of the vehicle in a forward direction is desired. In which case, the forward clutch 12 is engaged, whereupon torque is then transmitted from the driving element or bell 20 thereof through said clutch to the shaft 22 which is then rotated in a clockwise direction, and, since this shaft is drivingly coupled to the gear cluster 37 of the change-speed gear box unit 14, said cluster will rotate in a clockwise direction and the gear 38 thereon, being in constant mesh with gear 48, will cause the tubular countershaft 53 to rotate in an opposite or counterclockwise direction. Prior to the engagement of clutch 12, however, an appropriate speed gear ratio must be selected and the respective gears in the change-speed gear box unit 14 engaged to complete said selection, after which torque can be transmitted through the selected gear train to the beveled gear 57 which, as is understood, is maintained in meshing engagement with the final drive of the vehicle (not shown). It will be understood, of course, that since the arrangement and means for selection of the various gear train combinations through the change-speed unit are generally conventional, explicit and detailed description of the operation and setup of each such combination need not be provided herein. Suffice it to say, by way of example, it may be noted that by meshingly engaging gear 47 with gear 52 the lowest forward vehicle speed may be obtained, while meshing engagement of gear 42 with gear 39 will condition the unit for the highest forward speed gear ratio, and the remainder of the gears therein may be selectively engaged to effect speed gear ratios between these limits. Since the change-speed gear box or transmission unit assembly 14 illustrated herein is of generally conventional construction, it will be appreciated that the gear 47 may be engaged with reversing gear 56 to also effect a change in direction of rotation of the shaft 40 and beveled gear 57 affixed thereto, if desired, in order to use the capabilities of said conventional transmission to alternatively produce a change in direction of motion of the vehicle and to operate the vehicle in said reversed direction at a different speed ratio.

When the driving element 17 of the torque converter 11 rotates it carries with it the gear 58, and, since this gear is in constant and positive mesh with the gear 59 on shaft 60, the latter shaft will always be rotated in a direction opposite to that of input shaft 16, and which, in the present arrangement will be counterclockwise. Since shaft 60 is connected directly to the pulley 61 it will thus be seen that drive can be independently transmitted continuously from the input shaft 16 to the pulley 61 for operating auxiliary equipment therefrom.

Assuming, now, that it is desired to rapidly reverse the direction of motion of the vehicle, without changing the selected speed gear ratio of the change-speed transmission, and yet permit the vehicle to travel forwardly or rearwardly at a rapid rate of speed. In this event the forward motion clutch 12, which was previously engaged to effect forward motion of the vehicle, is actuated to effect disengagement thereof. Next the reverse motion clutch 13 is actuated to effect engagement thereof, whereupon drive is transmitted in a clockwise direction from the driving element 17 of the torque converter through the meshing gears 58 and 59, where the direction of rotation is reversed, to the power take-off shaft 60. Since gear 65 on said power take-off shaft is in constant mesh with the idler reversing gear 63 the direction of drive will again be reversed and transmitted by way of said gear to the gear 62 fixed for rotation with the driving element 28 of clutch 13. When the drive is transmitted between gears 63 and 62 its direction of rotation is again reversed, so that now it is again counterclockwise, after which it is then transmitted by way of the engaged clutch 13 to the intermediate shaft 22 which will then be caused to rotate counterclockwise (Figure 2), or in a direction opposite to that in which it previously rotated. This counterclockwise direction of rotation of shaft 22 will then be carried through the perviously selected speed-ratio gear train of gear box 14 to the beveled gear 57 and its associated final drive mechanism to effect movement of the vehicle in a reverse direction, with said drive path through the mechanism being illustrated in Figure 2.

Between each operation, involving a change in direction of motion of the vehicle, the snubber brake 32 will generally be actuated so as to effect engagement thereof thus stopping rotation of shaft 22. When the rotating movement of this shaft is stopped the vehicle will likewise be stopped because of the direct mechanical coupling, by way of a selected gear ratio in the gear box unit 14 and the final drive (not shown), between the shaft 22 and the rear wheels of the vehicle. It is not, of course, intended that this snubber brake be used in lieu of the conventional brakes for the vehicle, but rather as an anti-creep mechanism so as to prevent creeping of the vehicle, by virtue of drag through the clutches 12 and 13, when said clutches are disengaged. The snubber brake however, may also be used in place of the regular vehicle brakes to prevent vehicle creeping during periods when the motion of the vehicle is stopped for any one of a number of reasons.

In the event the vehicle has been operating in a preselected speed gear ratio in one direction and it is desired to reverse the direction of motion of the vehicle and also to change the speed gear ratio thereof from one ratio to another, it is only necessary to bring the vehicle to a stop, in conventional fashion, and then select a different speed gear ratio by engaging the appropriate gears in the gear box unit 14 to complete this ratio, after which either clutch 12 or clutch 13 may be engaged to obtain the direction of motion desired for the vehicle.

From the preceding it will be evident that when the forward direction of travel clutch 12 is engaged drive from the input shaft 16 is carried through the coupling elements of the torque converter 11 and clutch 12 to the intermediate shaft 22, but when the reverse direction of travel clutch 13 is engaged, and clutch 12 is disengaged, drive from the input shaft 16 by-passes or is carried around, and not through the fluid coupling elements of the torque converter and thence positively to the power take-off shaft 60 and subsequently through the gear train 65, 63 and 62, and clutch 13 to the intermediate power shaft 22. Hence, when the vehicle is being driven in a forwardly direction, as a result of engagement of the forward motion clutch 12, the drive must go through the fluid coupling elements of a hydro-kinetic device, whereas when the vehicle is driven in a rearwardly direction, as a result of engagement of the reverse motion clutch 13, the drive is through a mechanical power train that by-passes the fluid coupling elements of the hydrokinetic device, and thus is positive and more rapidly reactive. Furthermore, it will also be obvious that a portion of the power take-off power train functions at times in a dual capacity, and, in effect, may be said to be a power divider, because it is always operative to transmit power from the input shaft 16 to the belt pulley 61, and then when reversing clutch 13 is engaged this power take-off mechanism, additionally, operates as a portion of a power train that transmits drive from the input shaft 16 to the intermediate shaft 22. This dual acting or power-dividing operation is, of course, accomplished without interfering with the primary function of the power take-off mechanism, i.e. that of making power available for use with auxiliary equipment at the same time drive is also available for transmission from the input shaft to the vehicle final drive mechanism.

While only one form of the invention has been shown and described, it will be obvious that those skilled in the art that it is not so limited, but is susceptible of various changes and modifications without departing from the spirit thereof, and it is desired, therefore, that only such limitations shall be placed thereon as are specifically set forth in the appended claims.

What is claimed is:

1. A drive transmitting device comprising in combination, a first power shaft, a second power shaft, a hydro-kinetic torque converter including a driving element and a driven element and having said driving element connected to said first power shaft for rotation therewith, means connecting said first power shaft to said second power shaft including a plurality of alternatively operable clutch means and direction of rotation reversing means interconnecting one of the plurality of clutch means with the driving element of said torque converter and operative to reverse the direction of drive transmitted therebetween, said torque converter driven element being drivingly connected to the other one of said plurality of clutch means, said plurality of clutch means being disposed so that engagement of one of said clutch means effects the transmission of drive from the first power shaft to the second power shaft so as to cause said second shaft to rotate in the same direction as said first power shaft and engagement of another of said clutch means effects the rotation of said second power shaft in a direction reverse to that of said first power shaft, and braking means operable for braking said second power shaft when said plurality of clutch means are disengaged.

2. A drive transmitting device comprising in combination, a first power shaft, a second power shaft coaxially disposed relative to said first power shaft, a hydro-kinetic torque converter including a driving element and a driven element and having the driving element thereof connected to said first power shaft for rotation therewith, a first clutch means engageable for connecting the driven element of said torque converter with said second power shaft, a second clutch means drivingly connected to said second power shaft, drive train means including direction of rotation reversing means mechanically connected between the said second clutch means and the driving element of said torque converter for transmitting drive in a reverse direction of rotation from said first power shaft to said second power shaft when said second clutch means is engaged, and braking means operable for braking said second power shaft against rotation when both of said clutch means are disengaged.

3. A drive transmitting device comprising in combination, a first power shaft, a second power shaft, a hydro-kinetic torque converter including a driving element and a driven element and having the driving element thereof connected to said first power shaft for rotation therewith, a first clutch means engageable for connecting the driven element of said torque converter with said second power shaft, power take-off means including a power take-off shaft drivingly connected through mechanical direction of motion reversing means with the driving element of said torque converter and operative to effect the transmission of drive from said first power shaft to the power take-off shaft, a second clutch means drivingly connected to said second power shaft, drive train means connecting said power take-off shaft with said second clutch means whereby drive is transmittable to said second power shaft when said second clutch means is engaged, said first and second clutch means being selectively operable for transmitting drive from the first power shaft to the second power shaft in one direction of rotation when one of said clutch means is engaged and in an opposite direction of rotation when the other of said clutch means is engaged, and braking means operable for braking said second power shaft against rotation when both of said clutch means are disengaged.

4. A drive transmitting device comprising in combination, a casing, a first power shaft, a second power shaft coaxial with said first power shaft, a hydro-kinetic torque converter including a driving element and a driven element and having the driving element thereof connected to said first power shaft for rotation therewith, a first clutch means having a driving element connected to the driven element of said torque converter and a driven element connected to said second power shaft for rotation therewith and engageable for transmitting drive from the driven element of said torque converter to said second power shaft, a second clutch means having a driving element and a driven element and having the driven element thereof connected to said second power shaft for rotation therewith, power take-off means including a power take-off shaft and direction of motion reversing means mechanically connecting said power take-off shaft with the driving element of said torque converter and operative for transmitting drive in a reverse direction of rotation from said first power shaft to said power take-off shaft, positive drive train means connecting said power take-off shaft with the driving element of said second clutch whereby drive is transmitted upon engagement of said second clutch between said power take-off shaft and said second power shaft in a direction of rotation reverse to that of said first power shaft, and braking means mounted in part on said casing and on said second power shaft and operably engageable for preventing the rotation of said second power shaft when both of said clutch means are disengaged.

5. A drive transmitting device comprising in combination, a casing, a first power shaft, a second power shaft, a hydro-kinetic torque converter including a driving element and a driven element and having the driving element thereof connected to said first power shaft for rotation therewith, a first clutch means engageable for connecting the driven element of said torque converter with said second power shaft, power take-off means including a power take-off shaft displaced radially from said first power shaft and direction of motion reversing means mechanically connecting said power take-off shaft with the driving element of said torque converter and operative to effect the transmission of drive from said first power shaft to the power take-off shaft independent of the operation of said torque converter driven element and the said second power shaft, a second clutch means drivingly connected to said second power shaft, drive train means connecting said power take-off shaft with said second clutch means whereby drive is transmitted to said second power shaft when said second clutch is engaged, said first and second clutch means being disposed so that engagement of said first clutch means effects the transmission of drive from said first power shaft through the driving and driven elements of said torque converter to said second power shaft causing said latter shaft to rotate in the same direction as the former shaft and engagement of said second clutch means effects the transmission of drive through the driving element of said torque converter, the power take-off means and said connecting drive train means and causes rotation of said second power shaft in a direction reverse to that of said first power shaft, and braking means connected between said casing and said second power shaft and operable for preventing the rotation of said second power shaft when both of said clutch means are disengaged.

6. A drive transmitting device comprising in combination, a casing, a first power shaft, a second power shaft, a hydro-kinetic torque converter including a driving element and a driven element and having the driving element thereof connected to said first power shaft for rotation therewith, a first clutch means disposed in close proximity to the driven element of said torque converter and engageable for connecting said driven element with said second power shaft, power take-off means including a power take-off shaft displaced radially from said first power shaft and reversing means mechanically connecting the power take-off shaft with the driving element of said torque converter and operative to effect the transmission of drive from said first power shaft to the power take-off independent of the operation of said torque converter driven element and the second power shaft, a second clutch means drivingly connected to said second power shaft, drive train means connecting said power take-off shaft with said second clutch means whereby drive is transmitted from said power take-off shaft to said second power shaft without interfering with the operation of said power take-off shaft when said second clutch means is engaged, said first and second clutch means being arranged so that engagement of said first clutch means effects the transmission of drive from said first power shaft through the driving and driven elements of said torque converter shaft to said second power shaft causing said latter shaft to rotate in the same direction as the former shaft and engagement of said second clutch means effects the transmission of drive through the driving element of said torque converter the power take-off means and said connecting drive train means and causes rotation of said second power shaft in a direction reverse to that of said first power shaft, and braking means mounted in part on said casing and on said second power shaft and operably engageable for preventing the rotation of said second power shaft when both of said clutch means are disengaged.

7. A drive transmitting device comprising in combination, a casing, a first power shaft, a second power shaft, a hydro-kinetic torque converter including a driving element, fluid coupling elements, and a driven element and having the driving element thereof connected to said first power shaft for rotation therewith, a first clutch means engageable for connecting the driven element of said torque converter with said second power shaft, power take-off means including a drive shaft displaced radially from said first power shaft and a gear train reversing means positively and drivingly connecting said drive shaft with the driving element of said torque converter and operative to effect the transmission of drive from said first power shaft to said drive shaft independent of the operation of the fluid coupling elements and the driven element of said torque converter and of said second power shaft, a second clutch means drivingly connected to said second power shaft, mechanical drive train means positively connecting said drive shaft with said second clutch means whereby drive is positively transmitted from said drive shaft to said second clutch means without interfering with the operation of said drive shaft when said second clutch means is engaged, said first and second clutch means being arranged so that engagement of said first clutch means effects the transmission of drive from the first power shaft through the driving, coupling, and driven elements of said torque converter to said second power shaft causing the latter shaft to rotate in the same direction as the former shaft and engagement of said second clutch means effects the transmission of drive from the first power shaft through the driving element of said torque converter, the positively connected power take-off means and said mechanical drive train means and causes rotation of said second power shaft in a direction reverse to that of said first power shaft, and braking means mounted in part on said casing and in part on said second power shaft and operably engageable for preventing rotation of said second power shaft when both of said clutch means are disengaged.

References Cited in the file of this patent

UNITED STATES PATENTS

| 2,618,979 | Benning | Nov. 25, 1952 |
| 2,654,255 | Ferguson et al. | Oct. 6, 1953 |